United States Patent
Thiele et al.

(10) Patent No.: US 10,023,036 B2
(45) Date of Patent: Jul. 17, 2018

(54) VEHICLE DOOR SEAL APPARATUS AND METHOD OF USE

(71) Applicant: Honda Motor Co., Ltd., Tokyo (JP)

(72) Inventors: Steven Thiele, Marysville, OH (US); Khang Nguyen, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/807,690

(22) Filed: Jul. 23, 2015

(65) Prior Publication Data
US 2017/0021708 A1    Jan. 26, 2017

(51) Int. Cl.
| | |
|---|---|
| *B60J 10/25* | (2016.01) |
| *B60J 10/36* | (2016.01) |
| *B60J 10/86* | (2016.01) |
| *B60J 10/00* | (2016.01) |

(52) U.S. Cl.
CPC .............. *B60J 10/25* (2016.02); *B60J 10/36* (2016.02); *B60J 10/45* (2016.02); *B60J 10/87* (2016.02)

(58) Field of Classification Search
CPC ... B60J 10/87; B60J 10/25; B60J 10/36; B60J 10/45; E06B 7/22; E06B 7/23
See application file for complete search history.

(56) References Cited

U.S. PATENT DOCUMENTS

| | | | |
|---|---|---|---|
| 4,150,509 A | 4/1979 | Knap | |
| 4,544,198 A | 10/1985 | Ochiai et al. | |
| 5,209,546 A * | 5/1993 | Hasegawa | B60J 7/022 296/154 |
| 5,405,672 A * | 4/1995 | Takiguchi | B60R 16/0222 16/232 |
| 5,511,344 A * | 4/1996 | Dupuy | B60J 10/80 296/146.9 |
| 5,902,004 A * | 5/1999 | Waltz | B60J 5/0416 296/146.9 |
| 5,967,595 A | 10/1999 | Heya et al. | |
| 6,601,345 B2 | 8/2003 | Nozaki et al. | |
| 6,889,472 B2 | 5/2005 | Nozaki et al. | |
| 8,459,723 B2 | 6/2013 | Stoll | |
| 2011/0078959 A1 | 4/2011 | Nozaki | |

(Continued)

FOREIGN PATENT DOCUMENTS

| | | | |
|---|---|---|---|
| JP | 2013-112066 | * | 6/2013 |
| WO | WO 2015/029863 | * | 3/2015 |

*Primary Examiner* — Gregory J Strimbu
(74) *Attorney, Agent, or Firm* — Kenealy Vaidya LLP

(57) ABSTRACT

Some embodiments are directed to a seal assembly including a main door seal that extends around a vehicle door interior surface and that is spaced from a door perimeter. A first seal portion extends from an inward end thereof disposed along the main door seal to an outward end thereof disposed along the vehicle door perimeter. The first seal portion forms a barrier vertically above a latch slot, is capable of intercepting substances disposed above and traveling downward toward the latch slot, and facilitates transport of the intercepted substances to the door perimeter. A second seal portion is disposed between the latch slot and the vehicle door perimeter, and extends downwardly from the outward end of the first seal portion. The second seal portion is configured to impede travel toward the vehicle door interior surface of the intercepted substances that have been transported to the vehicle door perimeter.

20 Claims, 10 Drawing Sheets

(56) References Cited

U.S. PATENT DOCUMENTS

| | | | |
|---|---|---|---|
| 2012/0186159 A1* | 7/2012 | Thiele | E05B 77/34 |
| | | | 49/449 |
| 2014/0049067 A1* | 2/2014 | Kasuya | B60R 13/043 |
| | | | 296/146.5 |
| 2014/0290143 A1 | 10/2014 | Yamada et al. | |
| 2016/0368356 A1* | 12/2016 | Amagai | B60J 10/22 |

* cited by examiner

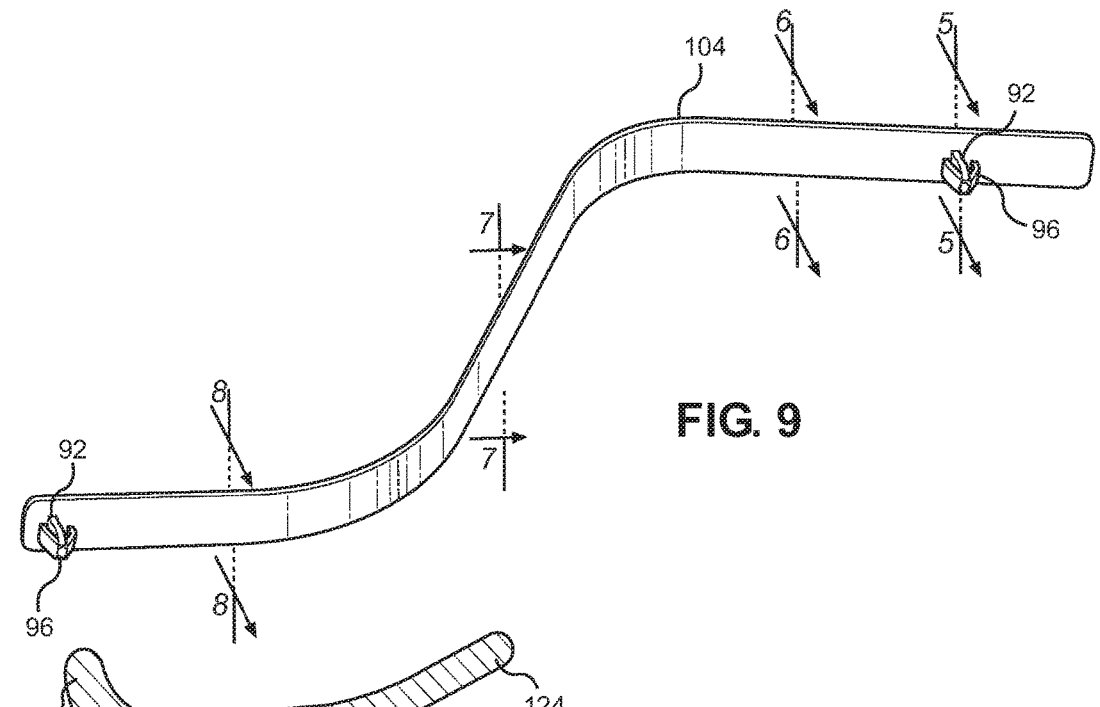
FIG. 9
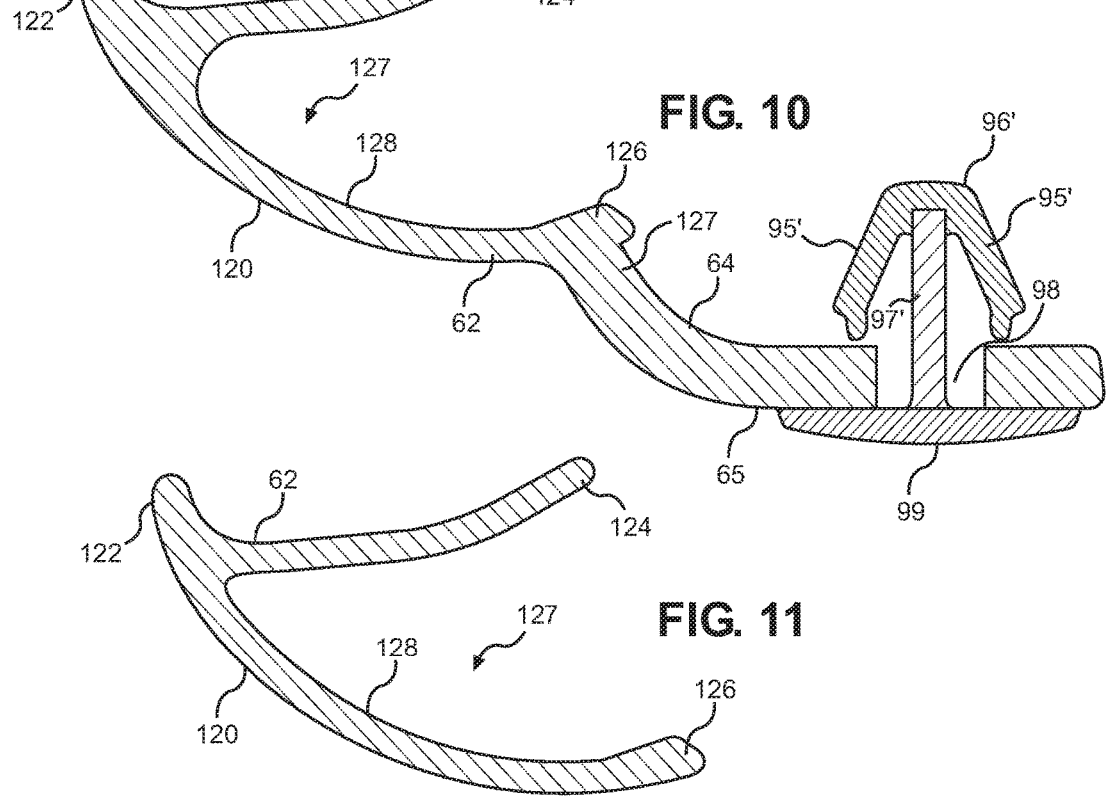
FIG. 10
FIG. 11

VEHICLE DOOR SEAL APPARATUS AND METHOD OF USE

BACKGROUND

The disclosed subject matter relates to a vehicle door seal apparatus, and methods of use and manufacture thereof. In particular, the disclosed subject matter relates to methods and apparatus for sealing vehicle doors, vehicle doors including the sealing apparatus, and methods of manufacturing the vehicle doors and the sealing apparatus.

Many types of vehicles, such as those that travel on land, through water, by air, etc. define exterior doors to allow ingress and egress of vehicle occupants. Some such vehicles include a single exterior door, while others may include multiple exterior doors. The doors can be configured to be opened and closed so that when they are opened, an occupant, object, etc. can enter and exit the vehicle, while when they are closed, the occupant, object, etc. is confined within the vehicle. In other words, one function of some vehicle exterior doors is to enable access or ingress to the vehicle interior when open, and to confine occupants, objects, etc. within the vehicle when closed. Doors may additionally be used to perform these functions for vehicle storage areas.

SUMMARY

Some vehicle exterior doors also perform a function of sealing or forming a barrier between the vehicle interior and the environment outside of the vehicle. For example, these vehicle doors impede the entry into the vehicle interior of various types of substances or conditions, such as gasses, liquids, solids, noises, etc., which are disposed or otherwise in existence outside of the vehicle.

However, it may be challenging for doors to form an effective barrier and impede the entry into the vehicle interior of some of these substances under certain conditions. For example, it may be difficult to ensure that the water (such as in the form of rain) that is prevalent in the exterior environment remains outside of the vehicle, especially when the vehicle is in motion. It may also be difficult for vehicle doors to shield the vehicle interior from noises, including but not limited to noises created or otherwise caused by motion of the vehicle, such as wind noise.

Thus, some vehicle doors include seals that facilitate or enhance the ability of the door to impede entry into the vehicle interior of the substances, conditions, etc. discussed above. Some vehicle doors include seals that extend around or adjacent a perimeter of the door, which may be beneficial by not only impeding entry of these substances, conditions, etc. into the vehicle interior, but also impeding contact with an interior surface or other interior components of the door, door frame, structural pillar (e.g., A-, B-, C-, or D-pillar), panel, vehicle components shielded by the door, etc. The effectiveness of these seals, which may be formed of a deformable material and project from an interior surface of the vehicle door around the door periphery, may be dependent on tightly contacting an opposing surface of the vehicle, e.g., panel, pillar, etc. In other words, tightly contacting the opposing surface causes the seal to deform and to become more compact.

This tight contact may be effective for some types of vehicle doors, such as those that move via hinge assemblies, but not for other types of doors. For example, doors that are actuated between open and closed positions via sliding movement may ultimately cause the seal to degrade. As the door slides along its path toward the open or closed positions, the seal disposed around the door periphery may contact other surfaces along its path, which may cause the seal to abrade, wear, etc. over time.

Some sliding doors (as well as other types of doors) therefore dispose seals at locations on the door interior surface that are spaced inward from the door perimeter, and thus to some extent shielded from contacting other surfaces as the door slides along its path. The inwardly disposed seals are thereby less subject to abrasion, wear, etc. as the door is slid between open and closed positions.

However, disposing the seals inwardly from the door perimeter may subject other surfaces to contact with the substances, conditions, etc. discussed above. As one example, the latch assembly disposed at an approximate midpoint of the vehicle door and spaced relatively proximate the door perimeter may be exposed to these substances, conditions, etc., such as water, which may ultimately cause components of the latch assembly to corrode, etc. The latch assembly may also be exposed to dust, dirt, or water that may freeze, which may all impede operation of the latching mechanism. In addition, the latch assembly may be disposed at least in part within an aperture, which may be contiguous, or otherwise communicate, with a path into the vehicle interior, such as proximate the interior door handle. Noises, such as wind noise generated during vehicle movement, may thereby enter the vehicle interior.

It may therefore be beneficial to address at least one of the issues discussed above and/or other issues. For example, it may be beneficial to provide methods and apparatus that effectively seal a vehicle door, while also reducing, mitigating, or preventing damage to the seal, such as abrasion, wear, etc., that may occur during opening and closing of the door. It may be especially beneficial to configure these methods and apparatus to be effective for use with sliding vehicle doors. In particular, it may be beneficial to dispose and configure a seal for a sliding door so as to reduce or prevent abrasion, wear, etc. during sliding of the door, while at the same time impeding the substances, conditions, etc. discussed above from contacting certain interior surfaces of the vehicle door, such as the latch assembly, aperture or slot surrounding or otherwise proximate the latch assembly, etc.

Some such embodiments accomplish at least one of the above benefits by disposing a main door seal inwardly from the door perimeter, and including an additional assembly to form a barrier between the substances, conditions, etc. discussed above and the latch assembly, aperture or slot surrounding or otherwise proximate the latch assembly, etc. In some embodiments, the additional assembly may include a first portion configured to intercept substances, conditions, etc. traveling vertically downward and inward of the door perimeter, and facilitate transport of the intercepted substances, conditions, etc. outwardly past the door perimeter. The additional assembly may also include a second portion disposed at the door perimeter to shield the latch assembly, aperture or slot surrounding or otherwise proximate the latch assembly from substances, conditions, etc. disposed outside the door perimeter, including the intercepted substances, conditions, etc. transported outwardly past the door perimeter.

Some embodiments are therefore directed to a seal assembly for impeding travel of substances relative to a vehicle door, which defines interior and exterior surfaces, and a perimeter extending between the interior and exterior surfaces. The vehicle door can include a latch assembly disposed at least in part within a latch slot that is spaced from the vehicle door perimeter.

The seal assembly can include a main door seal that extends around the vehicle door interior surface and that is spaced from the perimeter. A first seal portion can extend from an inward end disposed at the main door seal to an outward end disposed at the vehicle door perimeter, and can be configured to form a barrier vertically above the latch slot. The first seal portion can be capable of intercepting the substances disposed above and traveling downward toward the latch slot, and facilitating the transport of the intercepted substances to the vehicle door perimeter. A second seal portion can be disposed between the latch slot and the vehicle door perimeter, and can extend downwardly from the outward end of the first seal portion. The second seal portion can be configured to impede travel toward the vehicle door interior surface of the intercepted substances that have been transported to the vehicle door perimeter.

Some other embodiments are directed to a vehicle door assembly for impeding travel of substances toward a vehicle interior. The vehicle door assembly can include a vehicle door that defines interior and exterior surfaces, and a perimeter extending between the interior and exterior surfaces. The vehicle door can include a latch assembly disposed at least in part within a latch slot that is spaced from the vehicle door perimeter, and a seal assembly that is configured to impede travel of the substances toward the vehicle interior.

The seal assembly can include a main door seal that extends around the vehicle door interior surface and that is spaced from the perimeter. A first seal portion can extend from an inward end disposed at the main door seal to an outward end disposed at the vehicle door perimeter, and can be configured to form a barrier vertically above the latch slot. The first seal portion can be capable of intercepting the substances disposed above and traveling downward toward the latch slot, and facilitating the transport of the intercepted substances to the vehicle door perimeter. A second seal portion can be disposed between the latch slot and the vehicle door perimeter, and can extend downwardly from the outward end of the first seal portion. The second seal portion can be configured to impede travel toward the vehicle door interior surface of the intercepted substances that have been transported to the vehicle door perimeter.

Still other embodiments are directed to a method forming a seal so as to impede travel of substances relative to a vehicle door, which defines interior and exterior surfaces, and a perimeter extending between the interior and exterior surfaces. The vehicle door can include a latch assembly disposed at least in part within a latch slot that is spaced from the vehicle door perimeter.

The method can include: extending a main door seal around the vehicle door interior surface and so as to be spaced from the perimeter; extending a first seal portion from an inward end disposed at the main door seal to an outward end disposed at the vehicle door perimeter; configuring the first seal portion to form a barrier vertically above the latch slot and so as to be capable of intercepting the substances disposed above and traveling downward toward the latch slot, and then facilitating the transport of the intercepted substances to the vehicle door perimeter; disposing a second seal portion between the latch slot and the vehicle door perimeter, and so as to extend downwardly from the outward end of the first seal portion; and configuring the second seal portion to impede travel toward the vehicle door interior surface of the intercepted substances that have been transported to the vehicle door perimeter.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 9 is an isometric view of the first portion of the exemplary edge gap seal of FIG. 3 with cross-section view line locations.

FIG. 10 is a cross-section view of a joining seal of the exemplary edge gap seal of FIG. 3 with a connector at a connection point.

FIG. 11 is a cross-section view of the second portion of the exemplary edge gap seal of FIG. 3.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Vehicle Door Seal System

Figure 1:
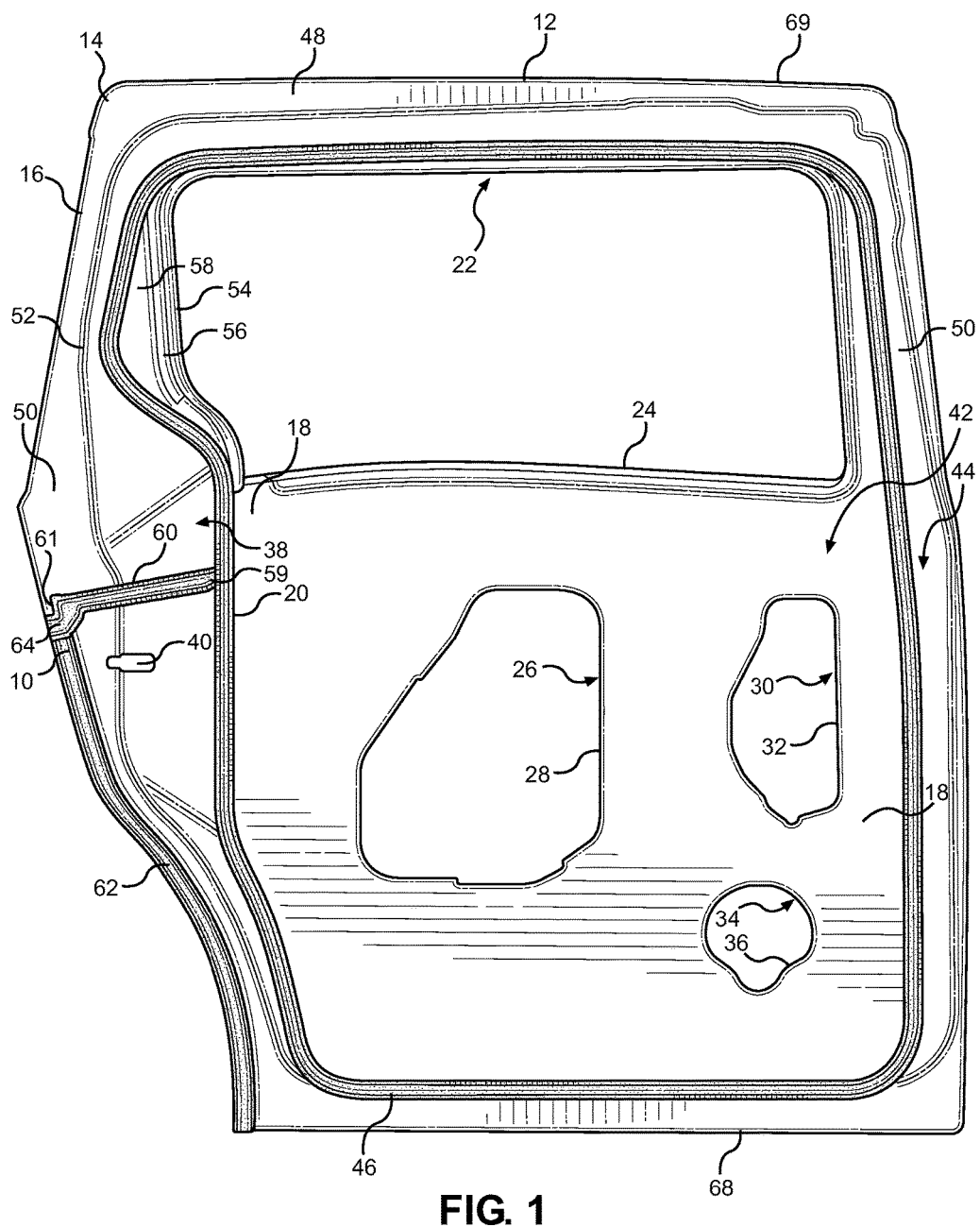
FIG. 1 is an interior side view of a vehicle slide door with a main door seal and an exemplary edge gap seal of the embodiments attached thereto.

FIG. 1 is an interior side view of a vehicle slide door 12 with a main door seal 46 and an exemplary edge gap seal 10 of the embodiments attached thereto. A vehicle slide door 12 can include an outside door panel 14, an inside door panel 18, and a window pane mounting cutout 22 defined by a window pane mounting cutout edge 24. Embodiments of the edge gap seal 10, however, are intended to include or otherwise cover one or more seals attached to a vehicle side door, a rear door, a front door, a back door, a roof opening, or any door apparatus that provides an opening to a vehicle's interior cabin from an exterior of a vehicle. Materials of manufacture for the edge gap seal 10 of the embodiments are intended to include or otherwise cover EDPM rubber, a thermoplastic elastomer mix of rubber and plastic, a thermoplastic olefin polymer/filler blend, or any material appropriate for a seal or weather-stripping around openings on a vehicle. The inside door panel 18 can be defined by an inside door panel edge 20 that can be defined as a perimeter around a door portion that faces inwardly to a vehicle cabin, the perimeter including an area around top end of the window pane cutout 22, a first cutout 26 that is defined by a first cutout edge 28, a second cutout 30 that is defined by a second cutout edge 32, and a third cutout 34 that is defined by a third cutout edge 36.

The outside door panel 14 can be defined by the area between the perimeter of the inside door panel 18 (e.g., the inside door panel edge 20) and the perimeter of the slide door 12 (e.g, the outside door panel edge 16). The outside door panel 14 can include various stamped, sloped, and/or flanged structural portions that are arranged on different relative geographic planes. For example, a thin surround portion 48 defines a flanged perimeter of the slide door 12. A slope 52 of the thin surround portion 48 slopes upwardly toward a flat surround portion 50 to meet the inside door panel edge 20. Around the periphery of the window pane mounting cutout 22 inside door panel 18 structure can include a flat window surround portion 54 that forms into a rising slope 56 of the flat window surround portion 54 that slopes upwardly towards a raised portion 58 above the flat window surround portion 54.

The slide door 12 can include a dry region 42 that is sealed from external moisture, dust, dirt, wind, etc., which can be defined as the inside door panel, i.e., an area of the slide door 12 inward from the inside door panel edge 20. The slide door 12 can also include a wet region 44 that is unsealed from external environmental conditions that include but are not limited to moisture, dust, wind, noise, etc., which can be defined by an area between the inside door panel edge 20 and the outside door panel edge 16. A latch slot 40 is disposed within the defined area of the outside door panel 14. Thus, the wet region 44 includes the latch slot 40, which can be exposed to external environmental conditions.

To ensure reliable moisture protection from external environmental conditions, the main door seal 46 is disposed around a periphery of the inside door panel 18, creating the dry region 42. The wet region 44 side of the slide door 12 is disposed outwardly from the main door seal 46 in all directions. The main door seal 46 is also disposed between the latch slot 40 and the inside door panel 18. In addition to protecting vehicle occupants from external environmental conditions, certain vehicle components may be mounted upon or attached to the vehicle slide door 12 in the dry region 42, such as but not limited to electrical drive units and switches for automatic window and mirror adjustments, sound system speaker(s), and interior door latch release handles.

The edge gap seal 10 can be defined as a seal including a first portion 60. The first portion 60 of the edge gap seal 10 can be disposed along the outside door panel 14 between the latch slot 40 and a top edge 69 of the vehicle slide door 12. In one embodiment, the first portion 60 is disposed at a point between the top edge 69 of the vehicle slide door 12 and the latch slot 40. In an embodiment, the first portion 60 can extend from the inside door panel edge 20 to a point on the outside door panel 14. In another embodiment, the first portion 60 can extend between the inside door panel edge 20 to a point on the outside door panel edge 16. In other embodiments, the first portion 60 can extend between any two points on the outside door panel 14 between the inside door panel 18 and the outside door panel 14. In an embodiment, the first portion 60 can extend along the outside door panel 14 between the main door seal 46 and the outside door panel edge 16.

The first portion 60 is further disposed such that a first end 59, located closest to the inside door panel 18, is elevated above a vertical plane that is generally parallel to a bottom edge 68 of the vehicle slide door 12 and defines a position of a second end 61, closest to the outside door panel edge 16. Thus, the first seal portion 60 can extend from the inward first end 59 disposed at the main door seal 46 to the outward second end 61 disposed at the vehicle door perimeter (outside door panel edge 16), and that is configured to form a barrier vertically above the latch slot 40 capable of intercepting the substances disposed above and traveling downward toward the latch slot 40, and facilitating the transport of the intercepted substances to the vehicle door perimeter.

The edge gap seal 10 can be further defined by the first portion 60 and a second portion 62. The first portion 60 can be joined to the second portion 62 at a seal joint 64. In an embodiment, the first portion 60 is a separate member from the second portion 62, and the first portion 60 and the second portion 62 cooperate to accomplish the advantages and functionality of the edge gap seal 10 described herein. In another embodiment, the first portion 60 and the second portion 62 are joined together at a point of contact, such as at the seal joint 64. In an embodiment, the second portion 62 is disposed between the first portion 60 and the bottom edge 68 of slide door 12 and is disposed between the latch slot 40 and the outside door panel edge 16 of slide door 12. In an embodiment, the second portion 62 can be disposed along a perimeter of the slide door 12 (outside door panel edge 16). In other embodiments, the second portion 62 can be disposed between the first portion second end 61, which is disposed closest to the outside door panel edge 16, to any point between the latch slot 40 and the bottom edge 68 of the slide door 12.

Figure 2:
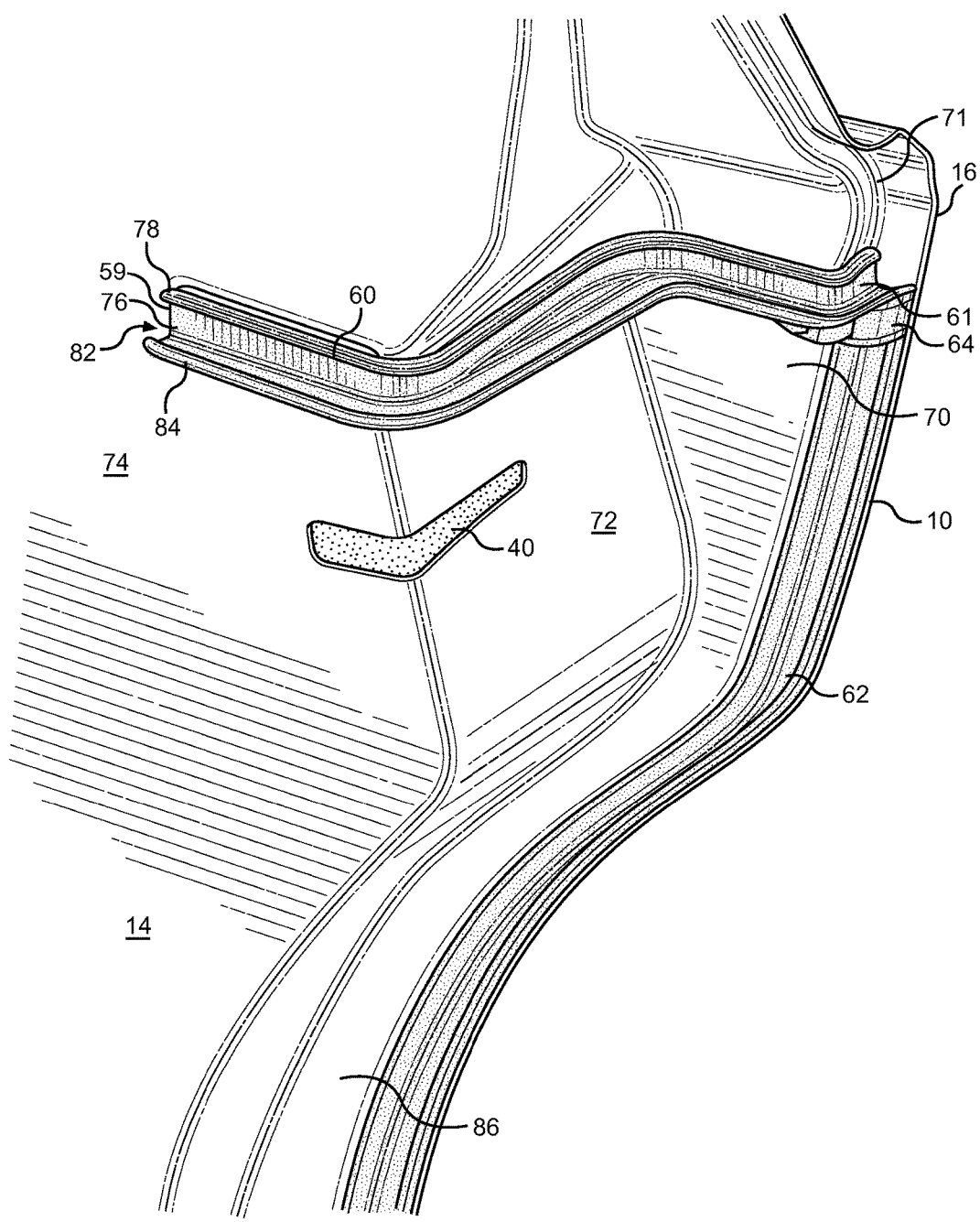
FIG. 2 is a detailed perspective view of a first portion and partial second portion of the edge gap seal of FIG. 1.

FIG. 2 is a detailed perspective view of the first portion 60 and the second portion 62 of the edge gap seal 10 of FIG. 1. The first portion 60 of the edge gap seal 10 can be further defined as an extended member disposed from the outside door panel edge 16, across an edge panel 71 that is disposed generally parallel to the vehicle slide door 12, a second panel 72 of the outside door panel 14 that is generally perpendicular to the inside door panel 18 of the vehicle slide door 12, a first panel 70 that is disposed generally parallel to the inside door panel 18 of the vehicle slide door 12, and a third panel 74 that is disposed generally perpendicular to the second panel 72 of the outside door panel 14 of the vehicle slide door 12. The first portion 60 can be defined as including a wall 76 of a substantially similar, or alternatively varying, height that parallels and attaches at certain points of the edge panel 71, the first panel 70, the second panel 72, and the third panel 74 of the outside door panel 14, described above. The wall 76 is disposed between a head protrusion 78 and an extended portion 84 that define a channel 82. The channel 82 may be formed by a base extending away from the wall 76 at similar or varying distances along the length of the first portion 60 (as described more fully below). The channel 82 may be further defined by the extended portion 84 that can extend a certain distance outwardly from the wall to a point above the base, as described more fully below.

The second portion 62 of the edge gap seal 10 can be joined to the first portion 60 at a joining location that can be defined as the seal joint 64 that joins the first portion 60 to the second portion 62.

The second portion 62 of the edge gap seal 10 is illustrated in FIG. 2 as disposed in a downwardly direction along perimeter of the slide door 12, e.g., a periphery of the first panel 70, following the curves of a curvilinear panel 86 of the first panel 70, generally between the outside door panel edge 16 and the second panel 72. The latch slot 40 is disposed on both the second panel 72 and the third panel 74.

Figure 3:
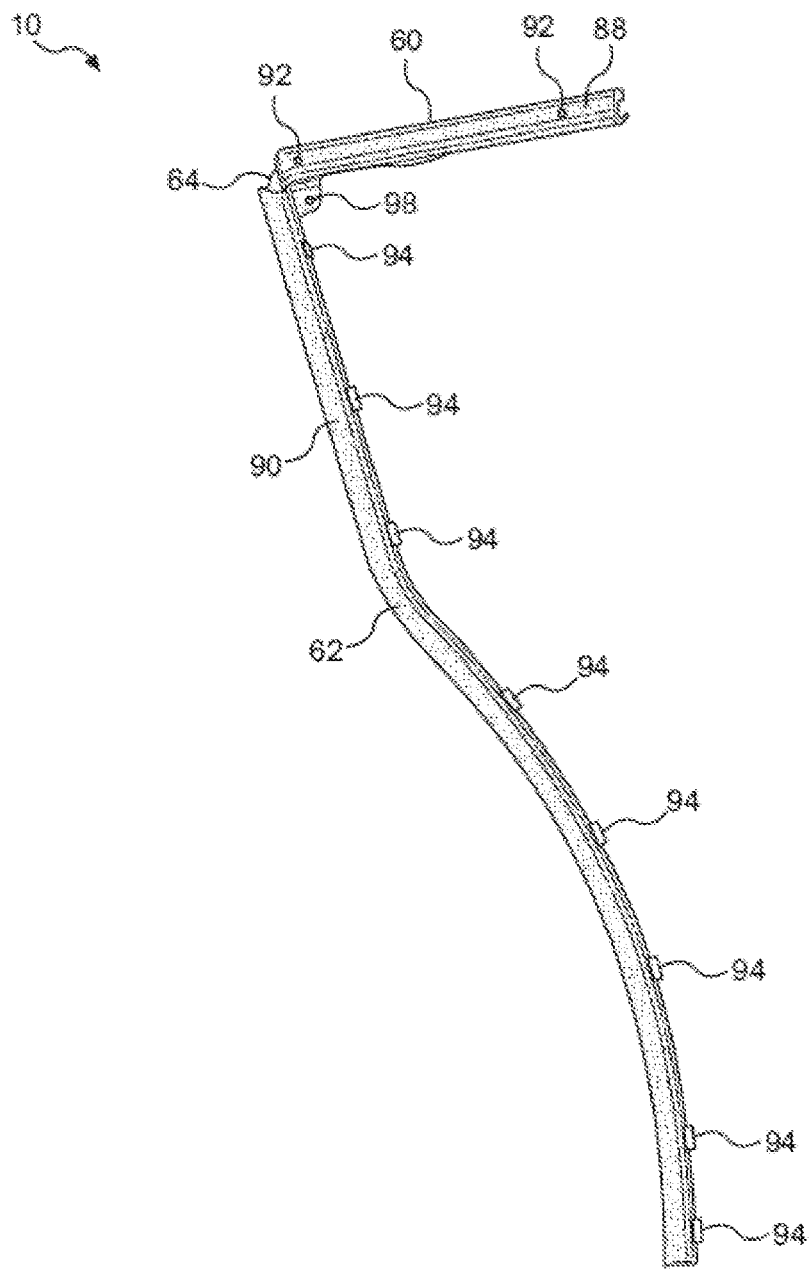
FIG. 3 is a reverse side perspective of view of the exemplary edge gap seal of FIG. 1.

FIG. 3 is a reverse side perspective of view of the exemplary edge gap seal 10 of FIG. 1. In FIG. 3, the exemplary edge gap seal 10 is illustrated from a perspective of a reverse side 88 of the first portion 60 and a reverse side 90 of the second portion 62 that can connect or otherwise secure to the outside door panel 14. In the embodiments, the reverse side 88 of the first portion 60 and the reverse side 90 of the second portion 62 can be connected or secured to the outside door panel 14 in any appropriate manner, such as but not limited to mechanical fasteners, glue, epoxy, welding, interference fitting, etc. In an embodiment first portion connection points 92 can be disposed at any appropriate location along the first portion 60. Similarly, one or more second portion connection points 94 can be disposed at any appropriate location along the second portion 62. In an embodiment, the second portion connection points 94 can be disposed on a side of the second portion 62 distal to the outside door panel edge 16. This can be advantageous so that the second portion connection points 94 do not interfere with the sealing function of the second portion 62 along the outside door panel edge 16 when the vehicle slide door 12 is placed into a closed position.

Figure 4:
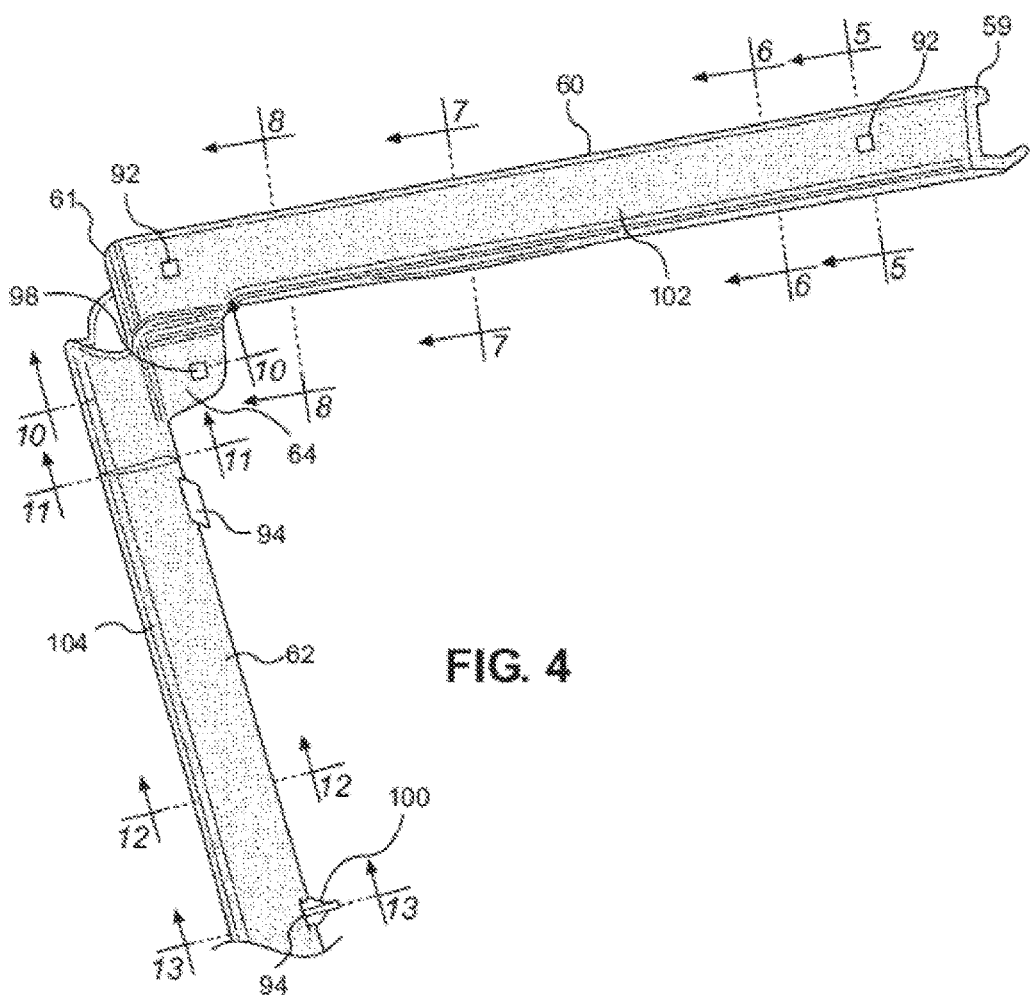
FIG. 4 is detailed reverse side perspective of view of the first portion and the second portion of the exemplary edge gap seal of FIG. 3 with cross-section view line locations.

FIG. 4 is detailed reverse side perspective of view of the first portion 60 and the second portion 62 of the exemplary edge gap seal 10 of FIG. 3 illustrating cross-section view line locations. In FIG. 4, cross-section lines 5 through 8 are distributed along the first portion 60 and cross-section lines 10 through 12 are distributed along the second portion 62. The cross-section line 5 corresponds to an isometric cross-section view in FIG. 5. The cross-section line 5 represents a perpendicular cut through the first portion 60 and one of the connection points 92 at a point on the first portion 60 disposed along the edge panel 71 of the outside door panel 14. The cross-section line 5 further represents a perpendicular cut through a first fastener 96 (see FIG. 5) that is disposed at one of the connection points 92. The cross-section line 6 corresponds to a cross-section view in FIG. 6. The cross-section line 6 represents a perpendicular cut through the first portion 60 at a point disposed along the first panel 70 of the outside door panel 14. The cross-section line 7 corresponds to a cross-section view in FIG. 7. The cross-section line 7 represents a perpendicular cut through the first portion 60 at a point disposed along the second panel 72 of the outside door panel 14. The cross-section line 8 corresponds to a cross-section view in FIG. 8. The cross-section line 8 represents a perpendicular cut through the first portion 60 at a point disposed along the third panel 74 of the outside door panel 14. The cross-section line 10 corresponds to a cross-section view in FIG. 10. The cross-section line 10 represents a perpendicular cut through the second portion 62 at a point disposed through the seal joint 64. The cross-section line 10 further represents a perpendicular cut through the first fastener 96 that is disposed at a seal joint connection point 98.

The cross-section line 11 corresponds to a cross-section view in FIG. 11. The cross-section line 11 represents a perpendicular cut through the second portion 62 at a point disposed adjacent to the first panel 70 of the outside door panel 14. The cross-section line 12 corresponds to a cross-section view in FIG. 12. The cross-section line 12 represents a perpendicular cut through the second portion 62 at a point disposed adjacent to the curvilinear panel 86 of the outside door panel 14. The cross-section line 13 corresponds to a cross-section view in FIG. 13. The cross-section line 13 represents a perpendicular cut through the second portion 62 at a point disposed adjacent to the curvilinear panel 86 of the outside door panel 14. The cross-section line 13 further represents a perpendicular cut through a second fastener 100 that is disposed at one of the second portion connection points 94.

FIG. 9 is a reverse isometric view of the first portion 60 of the exemplary edge gap seal 10 of FIG. 4 with cross-section view line locations. First fasteners 96 can be installed through connection points 92, which are disposed each near end 59 and end 61. In FIG. 9, the first fasteners 96 are exemplary and illustrated merely for purposes of clarity of the disclosure. In an implementation in the slide door 12, the first fasteners 96 would be installed through connection points in the outside door panel 14 that align to the connection points 92. The fasteners can be any type of fastener including but not limited to mechanical fasteners, glue, epoxy, welding, pressure fitting, etc. In a certain embodiment, the first fastener 96 is formed as push-through connector with one of the expanding prong 95 that inserts through a hole in one of the connection points 92 and prevents the first fastener 96 from backing out of one of the connection points 92.

The isometric view in FIG. 9 of the first portion 60 provides an additional disclosure for the cross-section lines 5 through 8 locations disposed along the first portion 60 in relation to various panel portions (e.g., the edge panel 71, first panel 70, second panel 72, and third panel 74) of the outside door panel 14. In summary, cross-section line 5 is adjacent to the edge panel 71, cross-section line 6 is adjacent to the first panel 70, cross-section line 7 is adjacent to the second panel 72, and cross-section line 8 is adjacent to the third panel 74.

Figure 5:
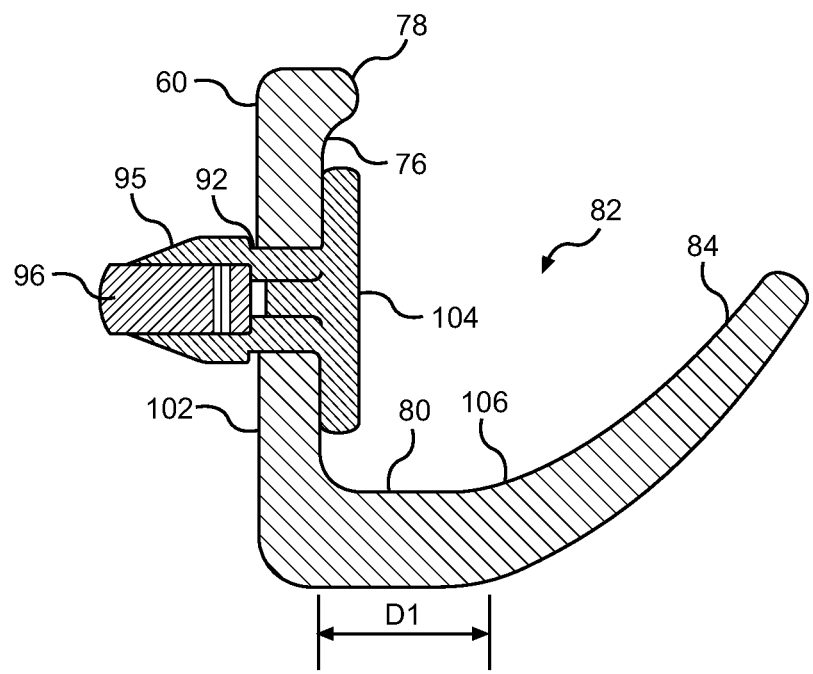
FIG. 5 is a cross-section view of the first portion of the exemplary edge gap seal of FIG. 3 with a connector at a connection point.
Figure 6:
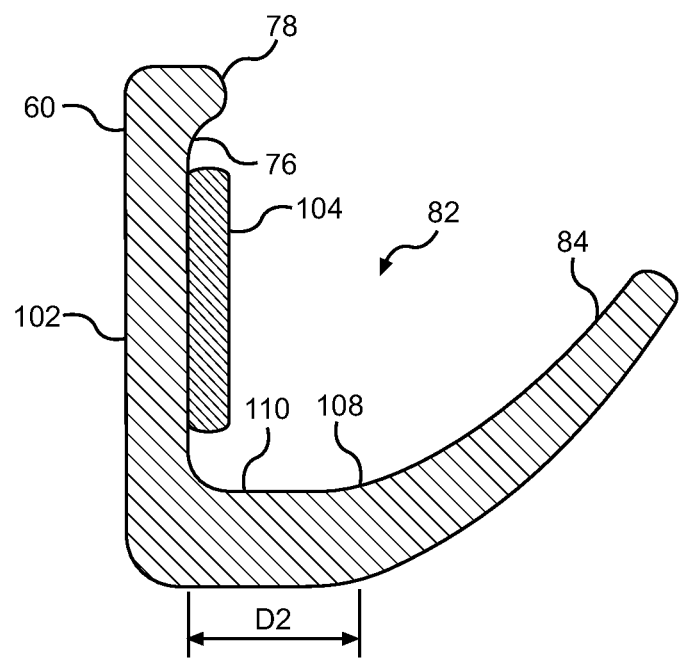
FIG. 6 is an additional cross-section view of the first portion of the exemplary edge gap seal of FIG. 3.
Figure 7:
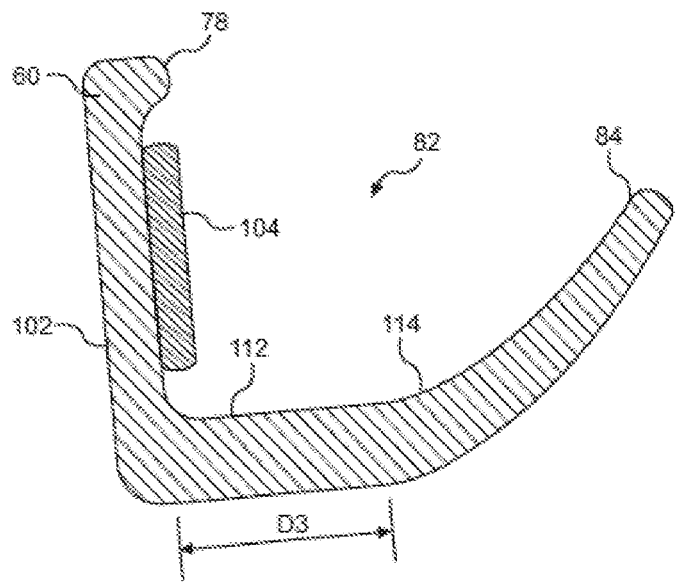
FIG. 7 is an additional cross-section view of the first portion of the exemplary edge gap seal of FIG. 3.
Figure 8:
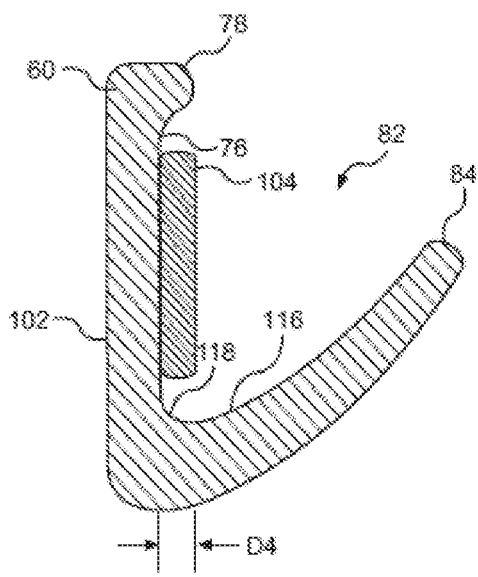
FIG. 8 is an additional cross-section view of the first portion of the exemplary edge gap seal of FIG. 3.

FIGS. 5 through 8 illustrate cross-section views from respective points along an embodiment of the first portion 60 of the edge gap seal 10, initiating near the slide door 12 perimeter at FIG. 5, and traversing inwardly towards the main door seal 46 at FIG. 8, as described above. The first portion 60 can include a back face 102, that forms the wall 76 on an opposing side, the head protrusion 78 disposed at a top end of the wall 76, and curved extension portion 84, along with a base 80 that can vary in disposition, which cooperate to define the channel 82. The channel 82 may be formed by the extended portion 84 extending away at an inflection point 106 in a generally C-shaped, or trough-like configuration from the wall 76 at similar or varying distances along the length of the first portion 60. The channel 82 may vary in width, as described below, but can be advantageously disposed to channel moisture or any fluid substance by gravity in an outwardly direction towards a slide door 12 perimeter and outside of a vehicle due to the downward slope of the first portion 60. The base 80 of the channel 82 can vary according to varying locations along the first portion 60 but continue to provide an adequate path for moisture to drain through the channel 82. The width of the channel 82 can vary for fitting to the different edge panel portions 70 to 74 of the outside door panel 14. For example, base 80 in FIG. 5 is disposed from the wall 76 to the inflection point 106 with width D1, a base 110 in FIG. 6 is disposed from the wall 76 to an inflection point 108 with width D2, a channel base 112 in FIG. 7 is disposed from the wall 76 to an inflection point 114 with width D3, and a base 118 is disposed from the wall 76 to an inflection point 116 with width D4 to form varying widths of the channel 82. In an additional example, the channel base 112 can be a greater width than other points of measure for channel widths in the first portion 60 in order to fill a wider gap between the second panel 72 of the outside door panel 14 a vehicle body panel disposed opposite the slide door 12 when the slide door 12 is in a closed position.

In the cross section of FIG. 5, the first fastener 96 fastened at one of the connection points 92 can include one or more of the expanding prongs 95 that can fit through one of the connection points 92 and subsequently extend outwardly against the back face 102. A stiffener 104 having the first fasteners 96 can be secured against the wall 76. In an embodiment, the first fastener can be provided as a bolt, screw, pin, etc. If additional fasteners are desired in a certain implementation, the stiffener 104 is disposed against the wall 76 in FIGS. 6 to 8 to illustrate those implementations. The stiffener 104 is not shown in FIGS. 1, 2, 14 and 15 for the sake of clarity.

FIG. 10 is a cross-section view of a joining seal to join the first portion 60 with the second portion 62 of the edge gap seal 10 of FIG. 1 at a connection point. In FIG. 10, the second portion 62 of the edge gap seal 10 is illustrated attached to the seal joint 64. The seal joint 64 attaches the second portion 62 to the end 61 of the first portion 60 at the seal joint connection point 98 via a first fastener 96'. The structure of the second portion 62 at cross section 10 can include a back face 120 and a curved extension portion 124 that joins to the back face 120 near a protrusion 122 of the back face 120. An opposite side of the back face 120 forms a wall 128, and together the wall 128 and the curved extension portion 124 cooperate to form a channel 127 that is open to the outside door panel 14. The second portion 62 is joined to the seal joint 64 at an end portion 126, thereby forming a contiguous member at cross-section point 10. The seal joint 64 is attached to the first portion 60 near first portion end 61 via the first fastener 96', which also fastens the attached portions 60 and 62 to an aligned connection point on the outside door panel 14. The first fastener 96' can include one or more expanding prongs 95' that can fit through the seal joint connection point 98 and subsequently extend away from a central core 97' while remaining attached to a top end of the central core 97'. A head 99 of the central core 97' can be secured against a back face 65 of the seal joint 64. In an embodiment, the head 99 and central core 97' can be provided as a bolt, screw, pin, etc.

FIG. 11 is a cross-section view of the second portion 62 of the exemplary edge gap seal 10 of FIG. 3. The structure of the second portion 62 at cross section 11 can include the back face 120 that extends to the end portion 126 and the curved extension portion 124 that joins to the back face 120 near the protrusion 122 of the back face 120. An opposite side of the back face 120 forms the wall 128, and together the wall 128 and the curved extension portion 124 cooperate to form the channel 127 that is open to the outside door panel 14.

Figure 12:
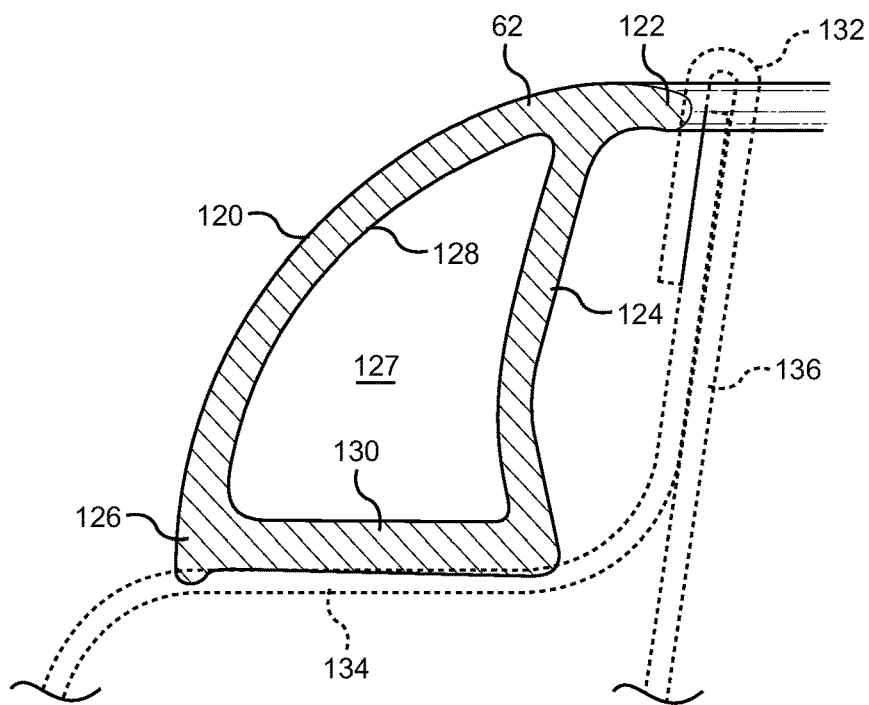
FIG. 12 is an additional cross-section view of the second portion of the exemplary edge gap seal of FIG. 3.

FIG. 12 is an additional cross-section view of the second portion 62 of the exemplary edge gap seal of FIG. 3. The structure of the second portion 62 of the edge gap seal 10 at cross section 12 can include the back face 120 and the curved extension portion 124 that join to the back face 120 near the protrusion 122 of the back face 120. An opposite side of the back face 120 forms the wall 128 that extends to end portion 126, and together the wall 128 and the curved extension portion 124 cooperate to form the channel 127. In contrast to the second portion 62 at cross section points 10 and 11, the structure at cross section 12 can include a support member 130 that can attach at distal ends to the curved extended portion 124 and the back face 120. The support member 130 thereby encloses the channel 127 such that the channel 127 is not open to the outside door panel 14.

In an alternative embodiment, the structure of the second portion 62 of the edge gap seal 10 at cross section 12 can be secured to a hook fastener 132 (shown in ghost lines) that extends around the back face 120 near protrusion 122. The hook fastener 132 can include a first extension 134 and a second extension 136 that can fasten to the outside door panel 14 at different connection points. The first extension 134 follows a path parallel to the support member 130 before securing to the outside door panel 14, and the second extension 136 can secure directly to a connection point on the outside door panel 14.

Figure 13:
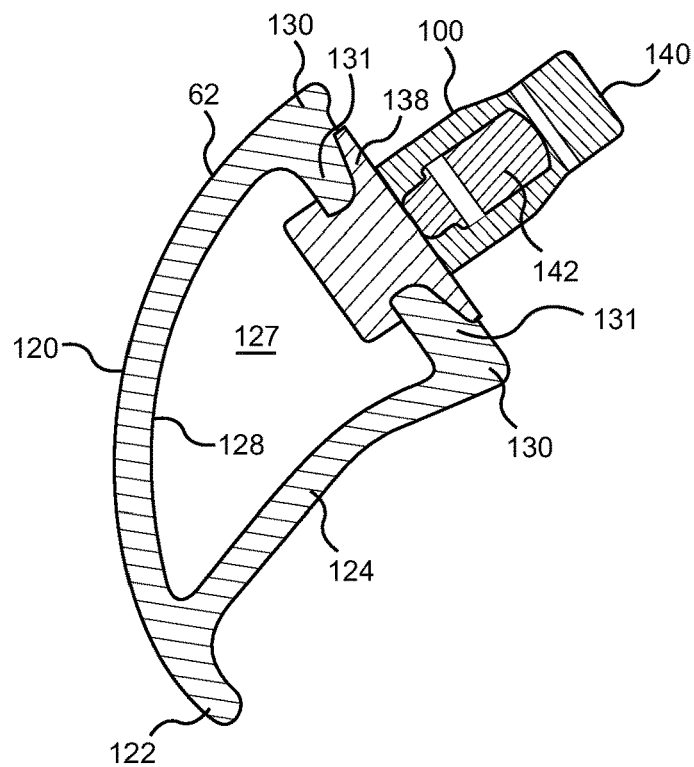
FIG. 13 is an additional cross-sectional view of the second portion of the exemplary edge gap seal of FIG. 3 with a connector at a connection point.

FIG. 13 is an additional cross-sectional view of the second portion 62 of the exemplary edge gap seal 10 of FIG. 3 with a connector at a connection point. The structure of the second portion 62 of the edge gap seal 10 at cross section 13 can include the back face 120 and the curved extension portion 124 that join to the back face 120 near the protrusion 122 of the back face 120. An opposite side of the back face 120 forms the wall 128, and together the wall 128 and the curved extension portion 124 cooperate to form the channel 127. Similar to the second portion 62 at cross section point 12, the structure at cross section 13 can include the support member 130 that can attach at distal ends to the curved extended portion 124 and the back face 120. The support member 130 thereby encloses the channel 127 such that the channel 127 is not open to the outside door panel 14.

To secure the second portion 62 at cross section point 13, the second fastener 100 can attach the second portion 62 to an aligned connection point on the outside door panel 14. The second fastener 100 can include a head 138 and a base 140 that can be connected via a central core 142. The second fastener 100 inserted through a connection point 131 formed as an opening in the support member 130. The head 138 of the second fastener 100 can be centrally flanged such that a top portion and bottom portion of the head 138 sandwich the support member 130. In an embodiment, the head 138 and the central core 142 can be provided as a single bolt, screw, pin, etc.

Figure 14:
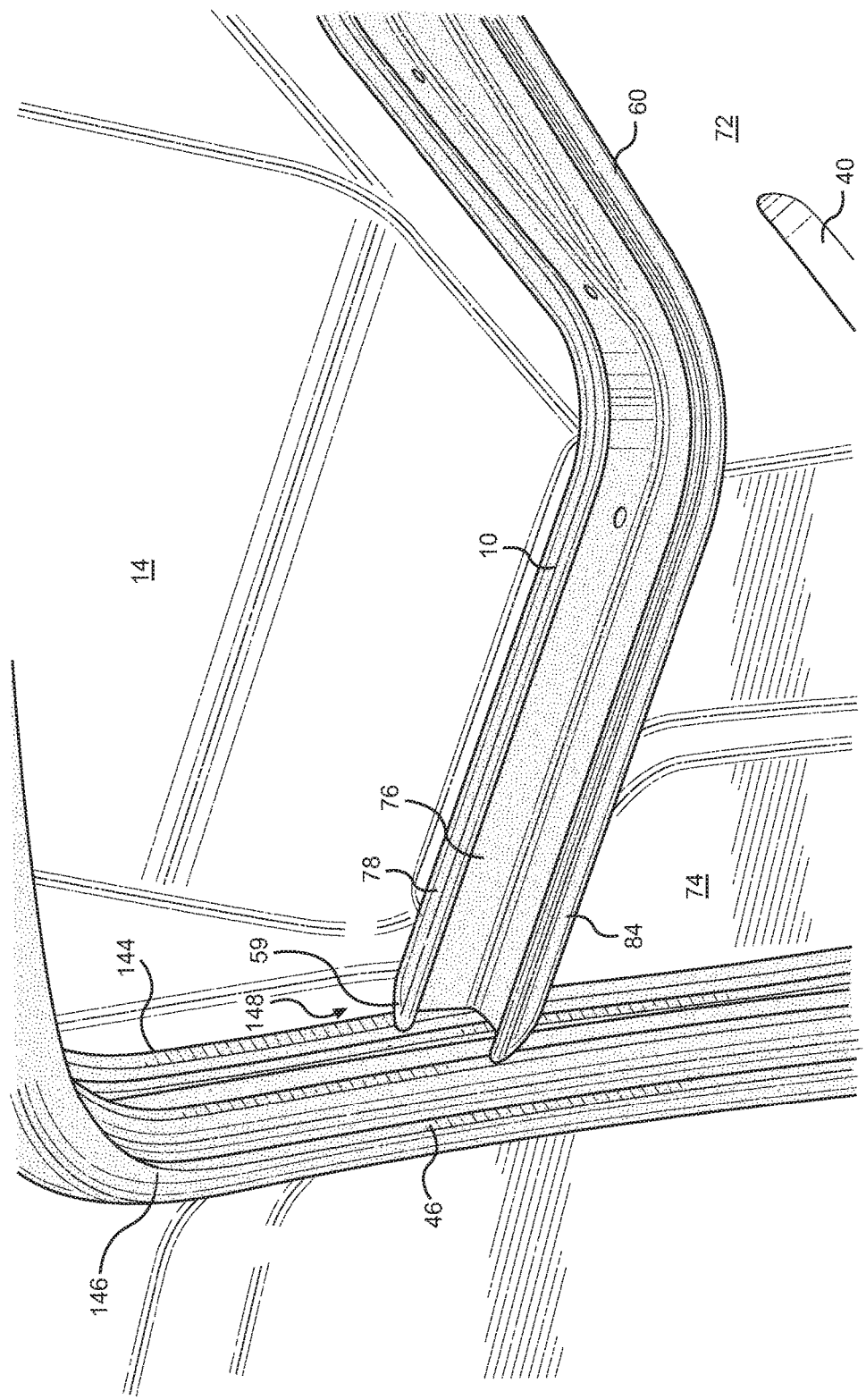
FIG. 14 is a detailed perspective view of the first portion of the edge gap seal of FIG. 2 at a joining point with the main door seal of FIG. 1.

FIG. 14 is a detailed perspective view of the first portion of the edge gap seal 10 of FIG. 2 at a joining point with the main door seal 46 of FIG. 1. In order to provide a sealed path to collect moisture draining on the outside door panel 14 into the first portion 60, a mold joint 148 between the first portion 60 and the main door seal 46 can be provided. The main door seal 46 can include a main door seal first portion 144 and a main door seal second portion 146 disposed around a periphery of the inside door panel 18 and can utilize a mold joint between both ends to create a closed structural loop. It can be beneficial to change a location of the mold joint 148 to coincide with a location where the first portion 60 contacts the main door seal 46. In an embodiment, the mold joint 148 can advantageously close a structural loop of the main body seal as well as connect the main body seal 46 to first end 59 of the first portion 60 of the edge gap seal 10.

Figure 15:
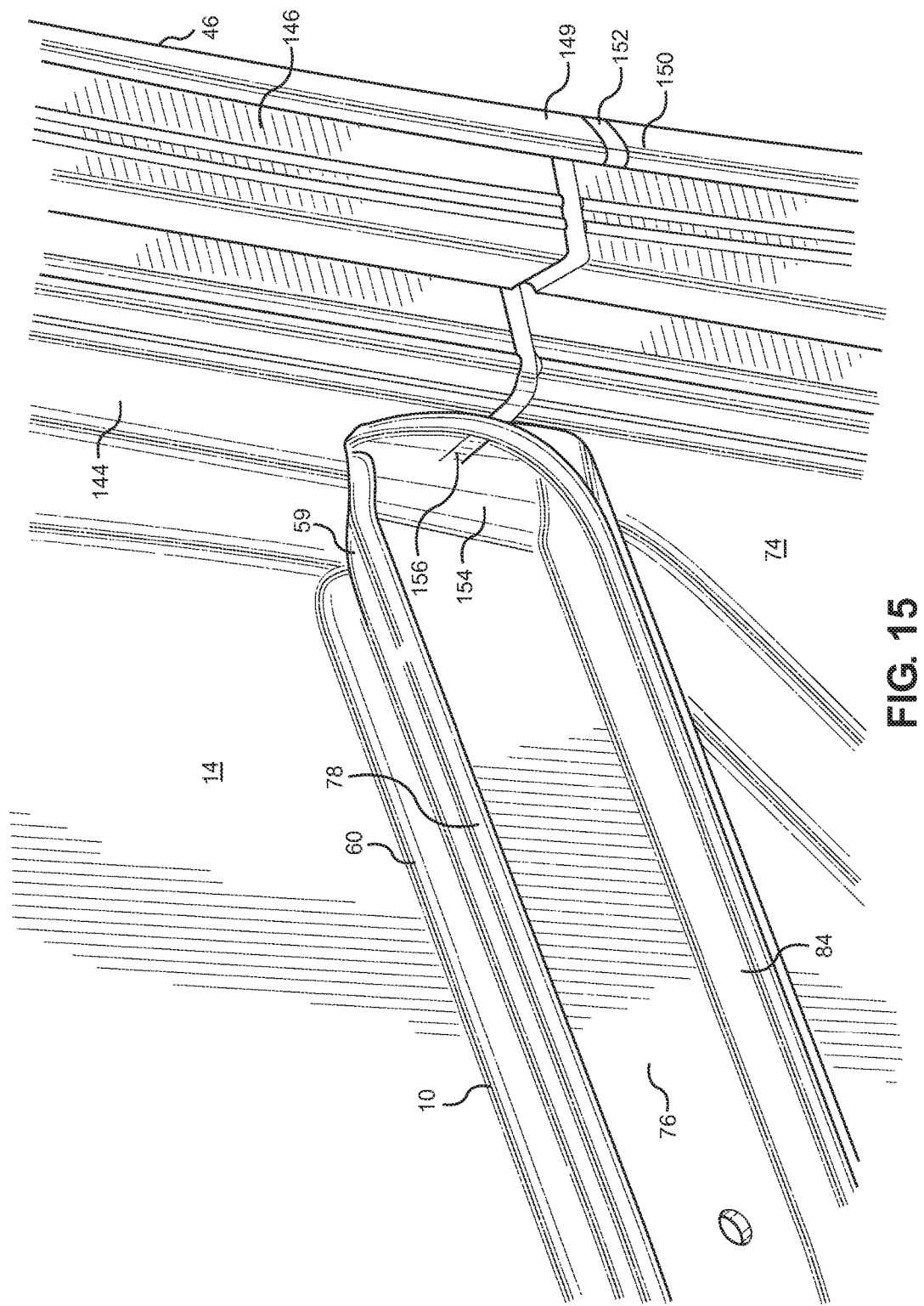
FIG. 15 is a detailed perspective view of an embodiment of the edge gap seal of FIG. 2 joined to the main door seal of FIG. 1.

FIG. 15 is a detailed perspective view an embodiment of the edge gap seal 10 of FIG. 2 joined to the main door seal 46 of FIG. 1. As described above, the main door seal 46 can include the main door seal first portion 144 and the main door seal second portion 146 disposed around a periphery of the inside door panel 18 beginning at a main door seal first end 149 and ending at a main door seal second end 150. The main door seal first end 149 and the main door seal second end 150 can be joined utilizing a butt mold 152 to create a closed structural loop of the main door seal 46. In the embodiment, a closed end portion 154 of the edge gap seal 10 abuts, at a perpendicular disposition, the main door seal first portion 144 of the main door seal 46 at the location of the butt mold 152.

In order to provide a sealed path to collect moisture draining on the outside door panel 14 into the edge gap seal 10, the closed end portion 154 can be molded to the butt mold 152 at butt mold portion 156, thereby forming a molded joint that connects the edge gap seal 10 to the main door seal 46. It can be beneficial to locate the butt mold 152 of the main door seal 46 to coincide with a location where the edge gap seal 10 contacts the main door seal 46 for at least to accomplish joining the main door seal first end 149 to the main door seal second end 150 of the main door seal 46 and joining the main door seal 46 to the edge gap seal 10 at the butt mold portion 156.

II. Alternative Embodiments

While certain embodiments of the invention are described above, and FIGS. 1-15 disclose the best mode for practicing the various inventive aspects, it should be understood that the invention can be embodied and configured in many different ways without departing from the spirit and scope of the invention.

Exemplary embodiments are intended to include or otherwise cover any type of manufacturing of the seals, members, portions, and structures of the embodiments.

While certain embodiments for a seal are intended for use in a vehicle door seal, the embodiments are intended to include or otherwise cover uses as roof rail seals, quarter window seals, window sweeps, window channel seals, windshield seals, rear window seals, side window seals, door window seals quarter window lock pillar seals, U-jamb seals, header seals, A-pillar seals, B-pillar seals, C-pillar seals, convertible top seals, T-top seals, trunk seals, or seals for any location on a vehicle.

Exemplary embodiments are intended to include or otherwise cover materials of manufacture for the edge gap seal 10 such as felt, vinyl, rubber, poly foam, vinyl tubing, and metals such as brass, steel, and aluminum.

While certain embodiments for a seal are intended for use to direct moisture away from a latch slot in a vehicle door panel, the embodiments are intended to include or otherwise cover uses to direct water away from any vehicle mechanism, attachment, electrical device, body panel cutout, etc. that could be damaged or degraded from contact with moisture from an exterior environment of a vehicle, especially when the vehicle is in motion.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A seal assembly for impeding travel of substances relative to a vehicle door, the vehicle door including an inside door panel and an outside door panel each defining interior and exterior surfaces, respectively, and the outside door panel includes an outside door panel edge, the vehicle door including a latch assembly disposed at least in part within a latch slot that is spaced from the outside door panel edge, the seal assembly comprising:

a main door seal mounted on the vehicle door interior surface, the main door seal extends around the vehicle door interior surface and is spaced from the outside door panel edge;

a first seal portion including an inward end that abuts the main door seal and an outward end that terminates at the outside door panel edge, the first seal portion extending from the main door seal to the outside door panel edge and being configured to form a barrier vertically above the latch slot to intercept the substances disposed above and traveling downward toward the latch slot to facilitate transport of the intercepted substances to the outside door panel edge; and a second seal portion disposed between the latch slot and the outside door panel edge, the second seal portion extending downwardly from the outward end of the first seal portion, the second seal portion being configured to impede travel toward the vehicle door interior surface of the intercepted substances that have been transported to the outside door panel edge.

2. The seal assembly according to claim 1, wherein the first seal portion includes a back face portion that defines a substantially planar back surface that is configured to be connected to the interior surface of the vehicle door, and the first seal portion includes an extension portion that extends at an angle from the back face portion and in a direction away from the vehicle door interior surface so as to define a channel between the back face portion and the extension portion.

3. The seal assembly according to claim 2, wherein the inward end is disposed at a location that is above the outward end of the first seal portion, such that the substances intercepted and disposed in the channel travel from the inward end toward the outward end.

4. The seal assembly according to claim 3, wherein an upper end of the back face portion of the first seal portion defines a head protrusion, and a lower end of the back face portion is proximate the extension portion.

5. The seal assembly according to claim 4, wherein a section of the first seal portion that is adjacent the outward end includes a first base portion that extends between the lower end of the back face portion and the extension portion, an upper planar surface of the first base portion being substantially perpendicular to the substantially planar back surface of the back face portion.

6. The seal assembly according to claim 5, wherein a second base portion extends from the first seal portion between the inward and outward ends, the second base portion extends between the lower end of the back face portion and the extension portion.

7. The seal assembly according to claim 6, wherein the second base portion is larger than the first base portion.

8. The seal assembly according to claim 4, wherein a section of the first seal portion that is adjacent the inward end of the first seal portion is configured such that the lower end of the back face portion is contiguous with the extension portion.

9. The seal assembly according to claim 2, further including multiple fasteners, wherein the back face portion of the first seal portion defines multiple apertures, the fasteners extending through the apertures to connect the first seal portion to the vehicle door.

10. The seal assembly according to claim 1, further including a seal joint that connects the outward end of the first seal portion to an upper end of the second seal portion.

11. A vehicle door assembly for impeding travel of substances toward a vehicle interior, the vehicle door assembly comprising:
a vehicle door including an inside door panel and an outside door panel each defining interior and exterior surfaces, respectively, and the outside door panel includes an outside door panel edge, the vehicle door including a latch assembly located at least in part within a latch slot that is spaced from the outside door panel edge; and
a seal assembly that is configured to impede the travel of the substances toward the vehicle interior, the seal assembly including:
a main door seal mounted on the vehicle door interior surface, the main door seal extends around the vehicle door interior surface and is spaced from the outside door panel edge;
a first seal portion including an inward end that abuts the main door seal and an outward end that terminates at the outside door panel edge, the first seal portion extending from the main door seal to the outside door panel edge and being configured to form a barrier vertically above the latch slot to intercept the substances disposed above and traveling downward toward the latch slot and facilitate transport of the intercepted substances to the outside door panel edge; and
a second seal portion disposed between the latch slot and the outside door panel edge, the second seal portion extending downwardly from the outward end of the first seal portion, the second seal portion being configured to impede the travel toward the vehicle interior of the intercepted substances that have been transported to the outside door panel edge.

12. The vehicle door assembly according to claim 11, wherein the first seal portion includes a back face portion that defines a substantially planar back surface that is configured to be connected to the interior surface of the vehicle door, and the first seal portion includes an extension portion that extends at an angle from the back face portion and in a direction away from the vehicle door interior surface so as to define a channel between the back face portion and the extension portion.

13. The vehicle door assembly according to claim 12, wherein the inward end is disposed at a location that is above the outward end of the first seal portion, such that the substances intercepted and disposed in the channel travel from the inward end toward the outward end.

14. The vehicle door assembly according to claim 13, wherein an upper end of the back face portion of the first seal portion defines a head protrusion, and a lower end of the back face portion is proximate the extension portion.

15. The vehicle door assembly according to claim 14, wherein a section of the first seal portion that is adjacent the outward end includes a first base portion that extends between the lower end of the back face portion and the extension portion, an upper planar surface of the first base portion being substantially perpendicular to the substantially planar back surface of the back face portion.

16. The vehicle door assembly according to claim 15, wherein a second base portion extends from the first seal portion between the inward and outward ends, the second base portion extends between the lower end of the back face portion and the extension portion.

17. The vehicle door assembly according to claim 16, wherein the second base portion is larger than the first base portion.

18. The vehicle door assembly according to claim 14, wherein a section of the first seal portion that is adjacent the inward end of the first seal portion is configured such that the lower end of the back face portion is contiguous with the extension portion.

19. The vehicle door assembly according to claim 12, further including a seal joint that connects the outward end of the first seal portion to an upper end of the second seal portion, and multiple fasteners, wherein the back face portion of the first seal portion defines multiple apertures, the fasteners extending through the apertures to connect the first seal portion to the vehicle door.

20. A method of impeding travel of substances relative to a vehicle door, the vehicle door including an inside door panel and an outside door panel each defining interior and exterior surfaces, respectively, the outside door panel includes an outside door panel edge, the vehicle door including a latch assembly disposed at least in part within a latch slot that is spaced from the outside door panel edge, the method comprising:
mounting a main door seal on the vehicle door interior surface to extend around the vehicle door interior surface and to be spaced from the outside door panel edge;
providing a first seal portion that includes an inward end that abuts the main door seal and an outward end that terminates at the outside door panel edge, the first seal portion extending from the main door seal to the outside door panel edge;
the first seal portion forming a barrier vertically above the latch slot so as to be capable of intercepting the substances disposed above and traveling downward toward the latch slot, and facilitating transport of the intercepted substances to the outside door panel edge;
disposing a second seal portion between the latch slot and the outside door panel edge so as to extend downwardly from the outward end of the first seal portion; and
the second seal portion impeding travel toward the vehicle door interior surface of the intercepted substances that have been transported to the outside door panel edge.

* * * * *